UNITED STATES PATENT OFFICE.

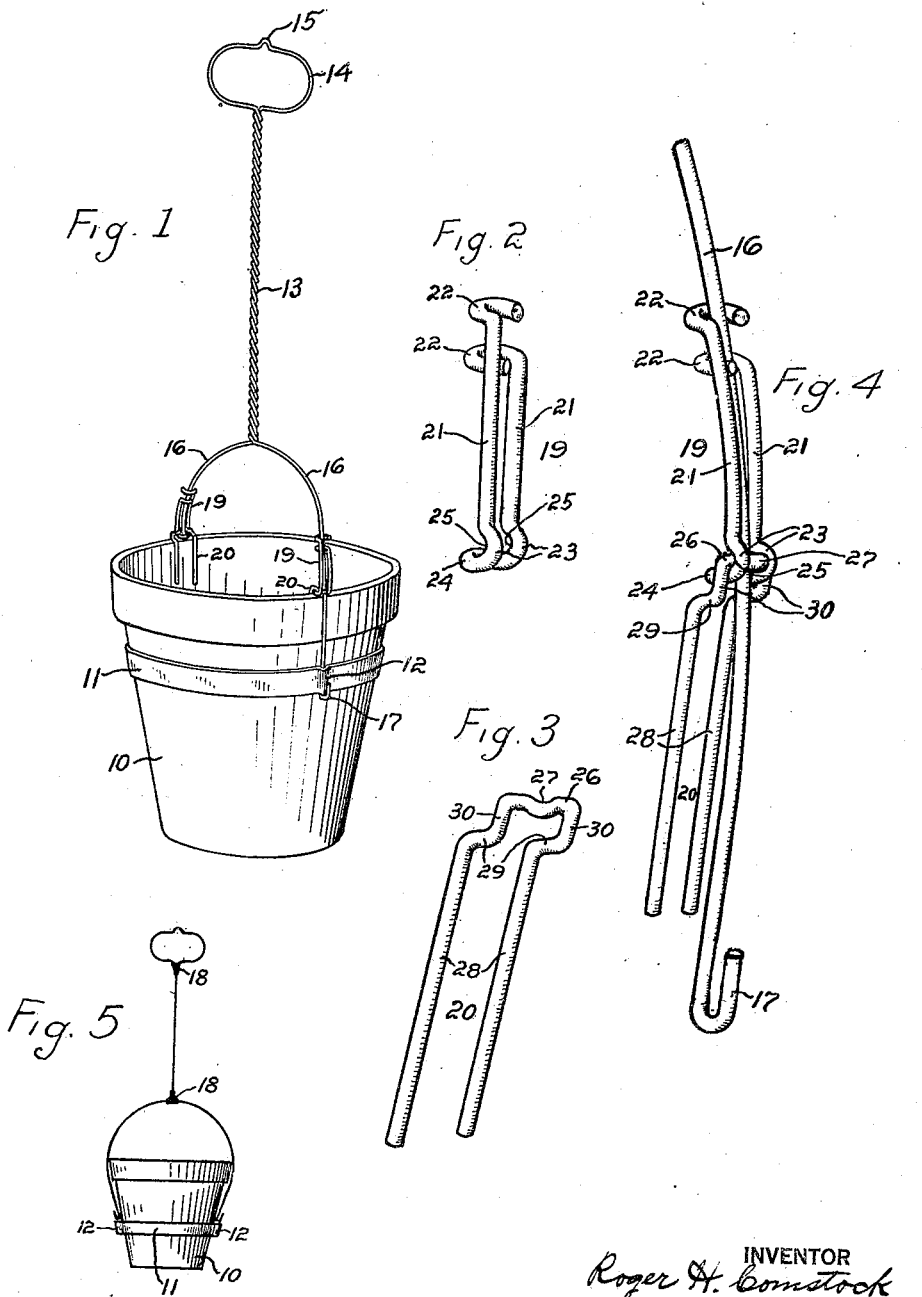

ROGER H. COMSTOCK, OF MILFORD, CONNECTICUT.

FLOWER-POT HANDLE.

1,369,965.  Specification of Letters Patent.  Patented Mar. 1, 1921.

Application filed May 3, 1920. Serial No. 378,715.

*To all whom it may concern:*

Be it known that I, ROGER H. COMSTOCK, a citizen of the United States, residing at 16 New Haven turnpike, Milford, county of New Haven, State of Connecticut, have invented an Improvement in Flower-Pot Handles, of which the following is a specification.

This invention provides a novel flower pot handle which is adapted to hold a pot in proper upright position and which can be conveniently and easily removed from one flower pot and applied to another. The handle is very simple in structure, cheap to manufacture and satisfactory in use.

With the above and other objects in view, the invention comprises the construction and arrangement of parts as now to be fully described and hereinafter specifically claimed.

In the accompanying drawing forming a part of this specification,

Figure 1 is a perspective view of the novel handle applied to a flower pot;

Fig. 2 a perspective view of one of the members of the clamp of the invention;

Fig. 3 a perspective view of the other member of the clamp;

Fig. 4 a fragmentary perspective view of an arm of the handle, showing the clamp as when in position; and Fig. 5 is an elevation of a flower pot provided with a modified form of handle.

10 denotes a flower pot of conical shape, and 11 denotes a flared ring which is beaded at diametrically opposite points, as indicated at 12. The handle of Fig. 1 consists of a stake 13 which is formed from a piece of wire doubled and twisted together to form the stake proper and has at its upper end a loop 14, formed from the midportion of the piece of wire and provided with a central bend 15 to prevent lateral slipping of the handle when hung from a support. Below the stake the strands of wire diverge and form arms 16 which curve outward and downward. The lower ends of the arms are provided with hooks 17. The lower portions of the arms fit in the beads in the flared ring and the hooks fit around the bottom edge of the ring, as more clearly shown in Fig. 1. The handle of Fig. 5 is an equivalent structure. As shown in this figure, the loop, the stake and the arms are formed of separate pieces of wire soldered to each other as indicated at 18, or the loop may be a continuation of the upper end of the stake. That is, the upper end of the stake may be shaped to form the loop and the free end of the shaped loop may be then soldered to the stake.

The novel clamps of the invention are duplicates of each other. Each consists of a wire clip as disclosed in Fig. 2, denoted by 19, and a U-shaped wire clip as disclosed in Fig. 3, denoted by 20. Clip 19 comprises a pair of shanks 21 one end of each of which is bent to form offset hooks 22 which are preferably positioned with respect to each other about as shown. The opposite ends of shanks 21 are bent to form half eye hooks 23, providing half eyes 25, and the shanks are integrally connected to each other by a curved connecting portion 24, as will be clear from Fig. 2. The U-shaped clip comprises a relatively narrow base 26 shaped to form a half eye 27, and relatively long parallel arms 28 which have parallel offset portions 29 and relatively short parallel portions 30 between the offset portions and the base, as more clearly shown in Fig. 3.

To attach the novel handle to a flower pot, the flared ring is first slipped onto the bottom of the pot to about the position shown in Fig. 5. The arms of the handle are then passed downwardly between the ring and flower pot and the lower ends of the arms are made to rest in the beads in the flared ring and hooks 17 are positioned beneath the ring as shown in Fig. 1. The flared ring is then slid up on the flower pot until the whole of its inner periphery is in close engagement with the outer surface of the pot. Both of the clamps are attached in the same manner. To apply a clamp, curved connecting portion 24 of clip 19 is rested on the top edge of the flower pot so that the inner surface of said curved connecting portion engages one of arms 16 on the inner side thereof and the half eye hooks and their half eyes are opposite each other on the outer side of arm 16, the shanks of clip 19 in the meantime being held in an outward and upward inclining position with respect to the flower pot. The U-shaped clip is next made to straddle arm 16 so that half eye 27 engages the outer side of said arm, and so that the narrow base of this clip rests in half eyes 25 and the long parallel arms 28 thereof extend downwardly on the inner side of the flower pot. The hook ends of the shanks of clip 19 are then pushed upwardly and hooks 22 are made to engage arm 16, both of said hooks engaging the inner side of said arm and one arranged above the other, as will be clearly understood from Figs. 1 and 4. The long arms of the U-shaped clips will thus be caused to bear firmly against the inner surface of the flower pot and the lower portions of the arms of the handle will be drawn inward so that the upper portion of the pot is securely clamped. It will be apparent that the clamps thus insure the upright position of the handle. Further, curved connecting portions 24 of clips 19 and the walls of half eyes 27 in the bases of the U-shaped clips are, by the arrangement of the clips as described, caused to firmly grip arms 16 so that the clips are fixedly positioned on the arms. Consequently, the long arms of the U-shaped clips must permanently remain in position, and the curved connecting portions of clips 19 must permanently remain seated against the top of the flower pot so as to insure the position of the flared ring on the pot and the position of hooks 17 beneath the flared ring. The clamps can be easily removed by releasing hooks 22 from arms 16, and the handle can then be removed from the pot by sliding the flared ring downwardly on the pot to about the position of Fig. 5.

What I desire to claim is:

1. A flower pot handle, comprising a stake having a supporting loop at its upper end and downwardly and outwardly extending curved arms at its lower end, said arms provided with hooks at their lower ends which are adapted to removably engage a ring carried by a flower pot, and said arms further carrying removable clamping members each consisting of a U-shaped clip and a clip provided with an offset hook and a pair of half eye hooks, whereby said handle may be detachably connected to a flower pot and said clamps may be detachably connected to the arms of said handle so as to cause said arms to grasp a flower pot.

2. A flower pot handle, comprising downwardly and outwardly extending curved arms provided with hooks at their lower ends, a flared ring provided with beads beneath which said hooks are adapted to rest, and removable clamps carried by said arms and adapted to grasp upper portions of said flower pot.

3. A flower pot handle, comprising downwardly and outwardly extending curved arms provided with hooks at their lower ends, a flared ring provided with beads beneath which said hooks are adapted to rest, and removable clamps carried by said arms and adapted to grasp said flower pot, each of said clamps consisting of clips one of which is substantially U-shaped, and the other of which is provided with half eye hooks and a curved connecting portion between the hooks which are adapted to engage the base of the U-shaped clip and an arm of the handle and with offset hooks which engage the same arm.

4. A flower pot handle, comprising downwardly extending curved arms provided with hooks at their lower ends and carrying above said ends removable clamps each consisting of two clips which are adapted to engage each other, one of said clips partly surrounding an arm at spaced points on said arm and bearing on the upper edge of said flower pot, and the other of said clips partly surrounding an arm and clamped against the inner surface of said flower pot.

5. In a flower pot handle, a supporting arm carrying a removable U-shaped clip and a removable clip consisting of shanks provided with offset hooks, said clips adapted to engage each other and to engage said supporting arm and said flower pot.

In testimony whereof I affix my signature.

ROGER H. COMSTOCK.